United States Patent [19]

Hunt

[11] 4,304,002

[45] Dec. 1, 1981

[54] DATA PROCESSING SYSTEM WITH ERROR CHECKING

[75] Inventor: David J. Hunt, Hitchin, United Kingdom

[73] Assignee: International Computers Limited, London, England

[21] Appl. No.: 91,552

[22] Filed: Nov. 5, 1979

[30] Foreign Application Priority Data

Nov. 23, 1978 [GB] United Kingdom ............... 45858/78

[51] Int. Cl.$^3$ .................. G06F 11/10; G06F 15/16
[52] U.S. Cl. ............................. 371/49; 364/704; 364/738; 371/50
[58] Field of Search ............ 371/16, 49, 50, 68; 364/200, 704, 738, 741

[56] References Cited

U.S. PATENT DOCUMENTS 3,342,983  9/1967  Pitkowsky et al. ............ 364/738
3,925,647  12/1975  Louie ............................. 364/738

*Primary Examiner*—Jerry Smith
*Attorney, Agent, or Firm*—Hane, Roberts, Spiecens & Cohen

[57] ABSTRACT

A data processing system is disclosed consisting of a plurality of data processing elements and parity processing elements. The parity processing elements hold parity bits for checking the contents of the internal registers and internal stores of the data processing elements and perform substantially the same operations on the parity bits as the data processing elements perform on the data. However, some of these operations may invalidate the parity bits. In particular, the carry result from an addition operation is not always valid. A parity valid logic circuit is therefore provided to generate a signal which indicates whether the parity bits from all the parity processing elements are valid, and hence whether the parity check performed using these parity bits is valid.

7 Claims, 5 Drawing Figures

DATA PROCESSING SYSTEM WITH ERROR CHECKING

INTRODUCTION

This invention relates to data processing systems.

It is known to provide a data processing system comprising a plurality of substantially identical processing elements which perform data processing operations on separate data streams in response to a single stream of control signals applied in parallel to all the processing elements. The advantage of such a system is that, since it processes several data streams in parallel, the overall data processing rate can be much higher than that of a conventional processor where only one data stream is processed at any given time.

One such data processing system is described, for example, in British Patent Specification No. 1445714. Another is described in our copending British Patent Application No. 16182/78.

It is also known to check the correctness of data by using a check code (e.g. one or more parity bits) which is appended to each item of data (e.g. to each word or byte). Check codes have been used extensively in data transmission systems and also in conventional (single data stream) processing systems.

One object of the present invention is to provide the facility for data checking in a multiple data stream processor of the kind described above.

SUMMARY OF THE INVENTION

According to the present invention, there is provided a data processing system comprising: a plurality of substantially identical data processing elements each of which includes a store and processing logic for operating upon the contents of the store in response to a single stream of control signals which is applied in parallel to all the data processing elements; a check code processing element which also includes a store and processing logic, each location of the store of the check code processing element holding a check code for the data in the set of corresponding locations in the stores of the data processing elements, the check code processing element being controlled by the same stream of control signals as the data processing elements so that it performs on the check codes substantially the same operations as the data processing elements perform on the data; and checking means for combining data from the data processing elements with a check code from the check code processing element to produce a signal indicative of whether or not there is an error in the data.

BRIEF DESCRIPTION OF THE DRAWINGS

One data processing system in accordance with the invention will now be described by way of example with reference to the accompanying drawings of which.

GENERAL DESCRIPTION OF THE SYSTEM

Figure 1:
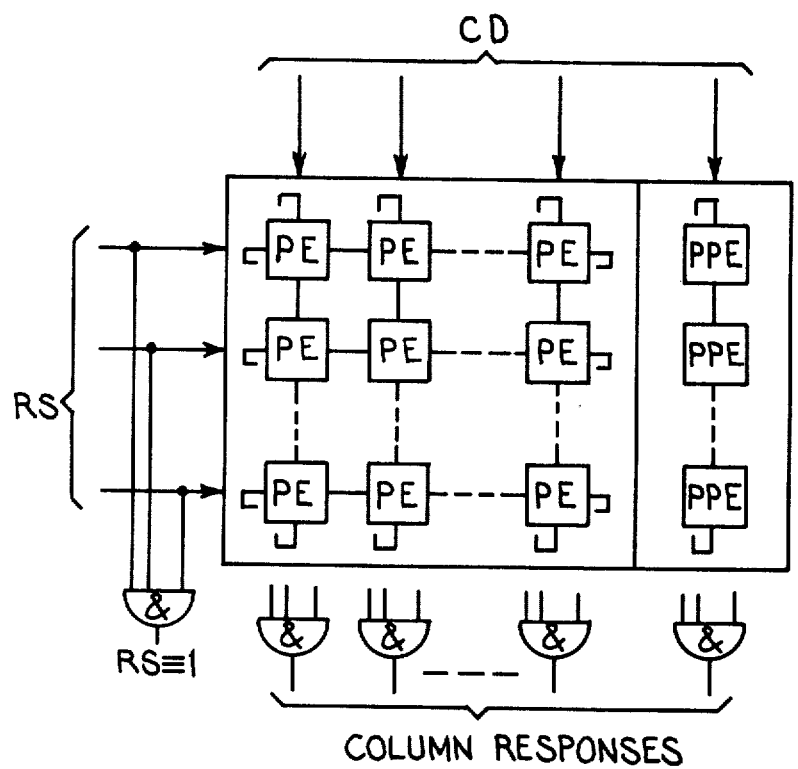
FIG. 1 is a block diagram of the processing system.

Referring to FIG. 1, the processing system comprises a two-dimensional array of data processing elements PE, connected together in rows and columns. There is an even number of elements PE in each row. Typically there may be 64×64 elements in the array. Each element is connected to its four nearest neighbours in the north, east, south and west directions, to permit data to be transferred between them. The connections at the edges of the array are cyclic, such that the top element of each column is effectively the southern neighbour of the bottom element of the same column, and the leftmost element of each row is effectively the eastern neighbour of the rightmost element in the same row.

The array also includes a further column of elements, referred to herein as parity processing elements PPE, there being one parity processing elements for each row of the array. These parity processing elements are connected together in the vertical direction in the same way as the data processing elements PE. However, they are not linked to the neighbouring elements in the horizontal direction. The purpose of the parity processing elements PPE is to store and manipulate parity bits for the data processing elements PE, as will be described in detail later. Operation of the array is controlled by a set of signals which are broadcast to all the elements (PE and PPE) in the array, such that each element receives exactly the same control signals. Information can also be input to the array by a set of column data lines CD (one per column) and a set of row select lines RS (one per row). The way in which the control signals and input information are generated forms no part of the present invention and may be achieved by any convenient means. For example, a microprogram control unit may be used.

Data can be read out from the array as a set of COLUMN RESPONSE signals (one per column). As shown, each COLUMN RESPONSE signal is formed by combining outputs from the individual elements in the column in question by means of an AND circuit. A set of row response signals (not shown) may be formed in a similar manner.

Each data processing element PE is very simple in structure, being capable of performing only bit-serial operations, and hence is relatively slow in operation. However, the overall processing rate of the system is potentially high, since there are many processing elements operating in parallel.

DATA PROCESSING ELEMENT—STRUCTURE

Figure 2:
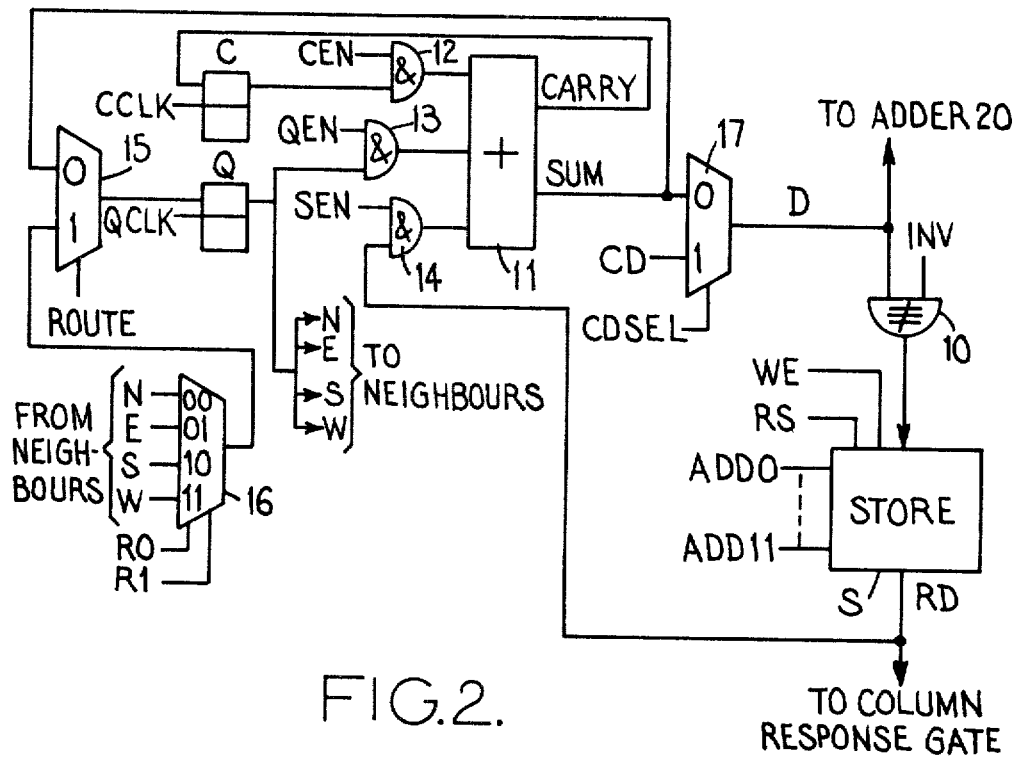
FIG. 2 is a circuit diagram of a data processing element.

FIG. 2 shows one of the data processing elements PE in detail. In this figure, the signals CCLK, QCLK, CEN, QEN, SEN, ROUTE, R0, R1, CDSEL, INV and WE are the control signals mentioned above, which are broadcast to all the processing elements. The control signals also include a twelve-bit store address ADD0-11.

The data processing element contains a store S, consisting of a 4096-bit random access memory, the bits of which are individually addressable by means of the address ADD0-11. The store S has an enable input which is connected to the row select line RS of the row in question. Thus, if a binary "1" signal is applied to any one of the row select lines RS, all the stores S in that row are enabled. The store S also has a write-enable input which receives the control signal WE. The store is enabled for writing only if both the enable input and the write-enable input are activated.

The data output RD of the store is connected to the AND circuit (FIG. 1) which forms the column response signal for the column in question. The data input of the store is obtained from a non equivalence gate 10, one input of which receives data signal D and the other input of which receives the control signal INV. It can be seen that, when INV=0, the data signal D is transmitted through the gate 10 to the store S without any inversion. However, when INV=1, the signal D is inverted before being applied to the store. The gate 10 thus provides a way of selectively inverting the data under the control of the signal INV.

The data processing element also contains a single stage binary full adder circuit 11, having three inputs and sum and carry outputs. The first input is connected by way of an AND gate 12 to the output of a single-bit carry register C. The second input is connected by way of an AND gate 13 to the output of a single-bit accumulator register Q. The third input is connected by way of an AND gate 14 to the data output RD of the store S. The AND gates 12, 13, 14 are controlled by signals CEN, QEN, and SEN respectively. The registers C and Q are clocked by signals CCLK and QCLK respectively.

The data input of the register C is connected to the carry output of the adder. The data input of the register Q is connected to the output of a multiplexer 15 which is controlled by the signal ROUTE. When ROUTE=0, the multiplexer selects its first input, which is connected to the sum output of the adder. When ROUTE=1, the multiplexer selects its second input, which is connected to the output of another multiplexer 16. This other multiplexer selects the output of the Q register of one of the four neighbouring data processing elements in the north, east, south and west directions, according to the value of the control signals R0, R1 as indicated. These signals R0, R1 constitute a routing code for controlling the direction of data flow between the elements.

The signal D is obtained from a multiplexer 17, which is controlled by the signal CDSEL. When CDSEL=0, the multiplexer 17 selects its first input, which is connected to the sum output of the adder. When CDSEL=1, the multiplexer selects its second input, which is connected to the column data line CD of the column in question.

OPERATION OF THE PROCESSING ELEMENT

It can be seen that, by applying various combinations of control signals to the array, each data processing element PE can be made to perform a variety of different processing operations. It is not necessary to describe every possible operation; however, some specific cases will be described to assist in understanding the operation of the processing element.

LOAD Q

This operation involves reading a data bit from the store and writing it into the accumulator register Q, by way of the adder. This is achieved by the following combination of control signals: RS=1, SEN=1, QEN=0, CEN=0, QCLK=1 and ROUTE=0.

RESET C

The C register can be reset by making QEN=0 and CEN=0, so that the carry output of the adder is zero, and by putting CCLK=1, causing the zero output to be clocked into the carry register C.

ADD STORE

This operation involves reading a data bit from the store, adding it to the contents of the C and Q registers, and writing the sum result into the Q register and the carry result into the C register. This is achieved by the following signals: RS=1, CEN=1, QEN=1, SEN=1, QCLK=1, ROUTE=0 and CCLK=1.

STORE Q

This causes the contents of the Q register to be written into the store. The control signals required are: CEN=0, SEN=0, QEN=1, CDSEL=0, RS=1 and WE=1. The data can be inverted, if desired, by making INV=1.

INPUT CD

This causes input data applied to the column data lines to be written into the store. The necessary control signals are CDSEL=1, RS=1 and WE=1. If INV=1, the data is inverted.

ROUTE

This causes the contents of each Q register to be shifted into the Q register of the nearest neighbour, in the north, east, south or west direction according to the value of the routing code R0, R1. The necessary control signals are ROUTE=1 and QCLK=1.

OUTPUT ROW

This causes the contents of the stores in a selected row of the array to be output over the column response lines. This is achieved by setting all the row select signals RS=0 except in the selected row, in which case RS=1. Thus, in the nonselected rows, the stores S will be disabled, and their data outputs RD will therefore assume a high voltage level representing binary "1".

PARITY PROCESSING ELEMENT

Figure 3:
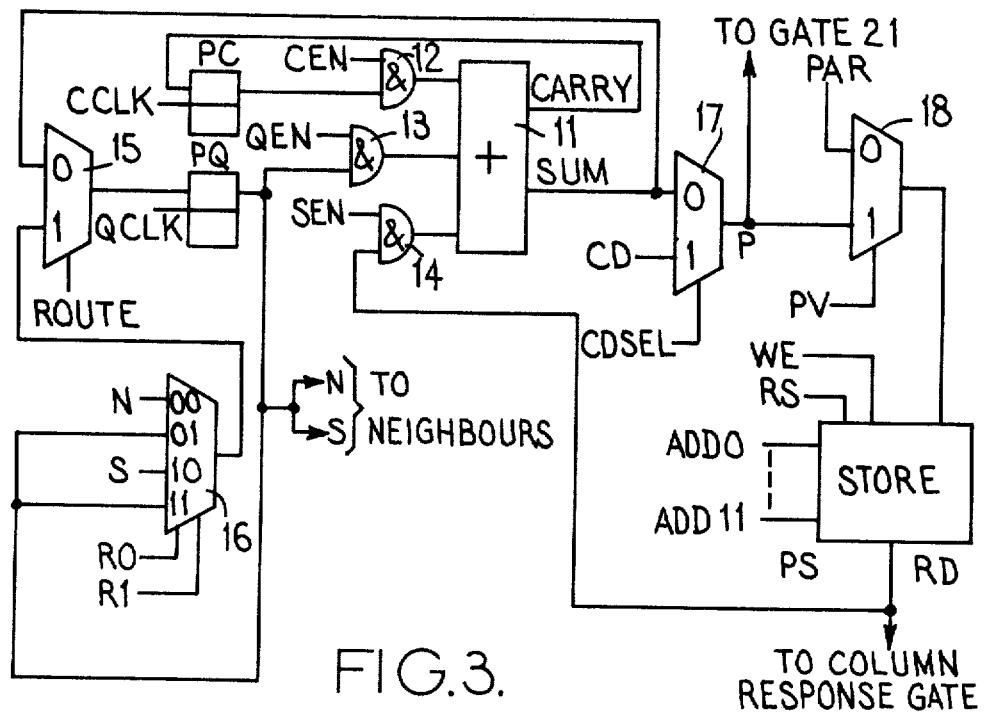
FIG. 3 is a circuit diagram of a parity processing element.

Referring to FIG. 3, this shows one of the parity processing elements PPE in detail. As can be seen, the element is substantially identical to the data processing element of FIG. 2. In particular, the parity processing element contains internal registers PQ and PC corresponding to the registers Q and C, and a 4096-bit store PS corresponding to the store S.

Each of the registers PQ and PC contains an even-parity bit for the set of corresponding data registers Q or C in the data processing elements PE in the same row of the array. For example, if the Q registers in a particular row contain the values 1, 0, 1, 1 (assuming, for the moment, that there are only four data processing elements in the row), then the PQ register in the same row should contain the parity bit "1" so as to maintain an even number of ones.

Similarly, each location of the store PS contains an even-parity bit for the set of corresponding locations in the stores S in the same row. For example, if locations no. 293 in the stores S of a particular row contain the values 1,0,0,1, then location no. 293 in the store PS of the same row should contain the parity bit "0".

The differences between the structure of the parity processing element and the data processing element are as follows.

(a) The parity processing element does not contain any non-equivalence gate analogous to the gate 10 in FIG. 2, and is therefore not capable of inverting the output of the multiplexer 17. The reason for this is that inverting a binary number with an even number of bits does not affect its parity. For example, the binary number 0010, when inverted, becomes 1101, both of these numbers having an odd number of ones. Thus, it is clear that parity bits should not be inverted.

(b) In the parity processing element, the east and west inputs (E and W) to the multiplexer 16 are connected to the output of the PQ register in the same element, instead of being connected to neighbouring elements. Thus, when data is shifted eastwards or westwards between the data processing elements, the contents of the PQ registers are not altered. The reason for this is that, since each row of processsing elements PE is connected cyclically, the number of ones in the Q registers of a row does not change when an east or west shift occurs.

(c) A multiplexer 18 is inserted between the multiplexer 17 and the store PS. The purpose of this multiplexer will be explained later.

As mentioned previously, each parity processing element receives exactly the same set of control signals as the data processing elements, and therefore performs the same operations on the parity bits as the processing elements PE perform on the corresponding data bits (subject to exceptions resulting from the differences just mentioned). Thus, one might expect, at first sight, that the parity processing elements should automatically maintain correct parity bits in the correct locations, relative to the corresponding data in the data processing elements. For example, if data is read out of the stores S and written into the Q registers, the corresponding parity bit is automatically read out of the store PS and written into the register PQ.

However, in the case of certain arithmetic operations, the parity bits may be invalidated. Suppose, for example, that the Q registers of a particular row of the array contain the values 1,0,1,1 and the C registers contain the values 1,1,0,0. Hence, the PQ register of that row should contain the parity bit "1" and the PC register should contain "0". Now suppose that the Q and C registers in each processing element are added together and the carry result is placed in the C register. The C registers of the row will now contain the values 1,0,0,0. Similarly, the contents of the PQ and PC registers are added and the carry result ("0") is placed in the PC register. It can be seen that the contents of the PC register are now invalid, since the parity bit for the C registers should be "1". This invalid parity bit may then corrupt the sum output of the adder during subsequent operations, making the contents of the PQ register invalid, and so on.

PARITY CHECKING

Figure 4:
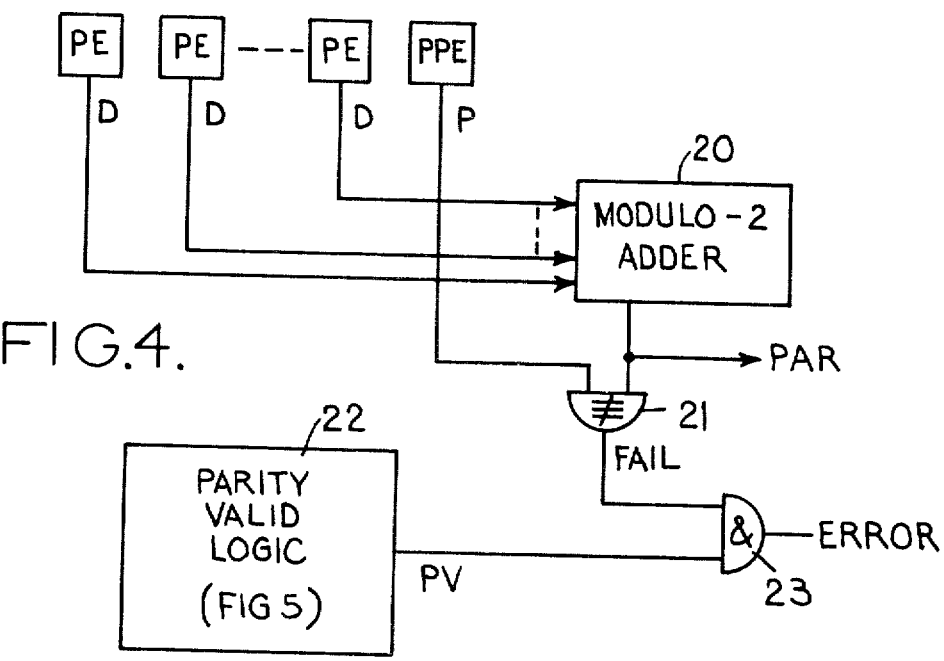
FIG. 4 shows the way in which parity checking is performed.

Referring now to FIG. 4, each row of the array has a parity checking circuit associated with it. Each parity checking circuit comprises an adder 20 which receives the output data bits D from each data processing element in the relevant row and forms the modulo-2 sum of these data bits. This sum provides an output signal PAR which represents the correct even-parity bit for the data. The parity bit PAR is applied to a non-equivalence gate 21 which also receives the corresponding parity bit P from the parity processing element PPE in the same row. If PAR is not equal to P, a signal FAIL is produced to indicate that the parity check has failed.

As explained above, the parity processing element PPE does not always contain valid parity bits and, in particular, the output parity bit P may not be valid. Therefore, the FAIL signal does not necessarily mean that an error has occurred.

The validity of the parity bits is monitored by means of a parity valid logic circuit 22, common to all the rows of the array. This circuit produces an output signal PV which is true only if the parity bits P from all the parity processing elements are definitely valid. The signal PV is combined in an AND gate 23 with the FAIL signal from the parity checking circuit, so as to produce an ERROR signal only if both $PV=1$ and $FAIL=1$. In this way, spurious FAIL signals resulting from invalid parity bits are ignored.

Referring again to FIG. 3, it can be seen that the PV signal also controls the multiplexer 18. When $PV=1$, the multiplexer 18 selects the signal P. However, when $PV=0$, the PAR signal is selected instead. Thus, the signal P can be written into the store PS only if it definitely represents a valid parity bit. Otherwise, the correct parity bit PAR is substituted.

PARITY VALID LOGIC

The parity valid logic circuit 22 will now be described in detail with reference to FIG. 5.

The parity valid logic contains two single-bit registers QV and CV. QV when set indicates that the contents of the PQ registers in all the parity processing elements are valid. Similarly, CV when set indicates that the PC registers are all valid.

As mentioned previously, the output signal PV is true only if the output signals P from all the parity processing elements are valid. Referring to FIG. 3, it can be seen that the signal P is derived either from the sum output of the adder 11 or from the column data line CD (when $CDSEL=1$). It is assumed that the column data line CD always carries a valid parity bit (generated by a suitable circuit external to the array).

Figure 5:
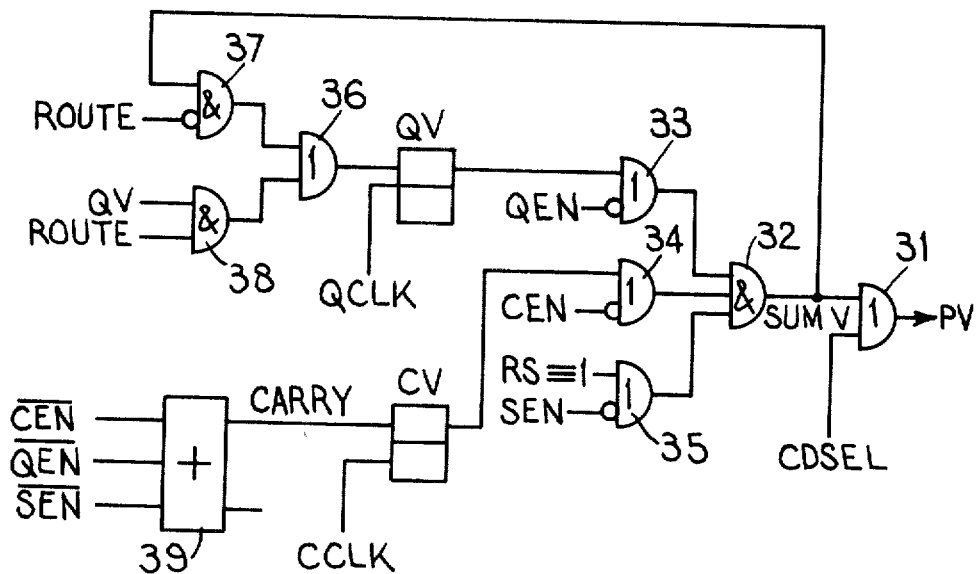
FIG. 5 shows a parity valid logic circuit.

Referring to FIG. 5, validity of the sum output is indicated by a signal SUMV. The PV signal is produced by combining the CDSEL signal and the SUMV signal in an OR gate 31, such that $PV=1$ if either $CDSEL=1$ or $SUMV=1$.

Referring again to FIG. 3, the sum output of the adder is valid if all its inputs are valid. The first input is valid if the PC register is valid. The first input can also be presumed valid if $CEN=0$, since in that case, this input will be zero in all the processing elements. (This follows from the fact that the correct even-parity bit for an all-zero word is zero). Similarly, the second input is valid if the PQ register is valid, or if $QEN=0$. Likewise, the third input is valid if the output RD from the store PS is valid, or if $SEN=0$. The store output RD is valid for every element only if the stores are enabled in all the rows of the array. This is indicated by a signal $RS=1$, produced by an AND gate as shown in FIG. 1.

Thus, referring to FIG. 5 again, the logic for producing the SUMV signal consists of an AND gate 32 which combines the outputs of three OR gates 33, 34, 35. OR gate 33 receives the output of the QV register and the inverse of the QEN signal, OR gate 34 receives the output of the CV register and the inverse of the CEN signal, and OR gate 35 receives the $RS=1$ signal and the inverse of the SEN signal.

Referring again to FIG. 3, it can be seen that each PQ register receives a valid parity bit when $QCLK=1$, and either (a) $ROUTE=0$ and the sum output of the adder is valid; or (b) ROUTE=1 and the contents of the PQ registers are already valid.

Referring back to FIG. 5, the logic for setting the QV register thus consists of an OR gate 36 which receives the outputs of two AND gates 37, 38. AND gate 37 receives the SUMV signal and the inverse of the ROUTE signal, while AND gate 38 receives the ROUTE signal and the output of the QV register.

Referring once more to FIG. 3, it can be seen that each PC register receives a valid parity bit when CCLK=1 and the carry output of the adder is valid. The validity of the carry output can only be presumed in certain special cases. One of these is the case where the carry output is identically zero in every element in the array. This occurs whenever at least two out of the three inputs to the adder 11 are disabled, i.e. at least two out of the signals CEN, QEN and SEN are zero.

Referring to FIG. 5, the logic for setting the CV register consists of an adder circuit 39 which receives the inverse of each of the three signals CEN, QEN and SEN. It can be seen that the carry output of this adder is true only if at least two of CEN, QEN and SEN are zero.

In summary, the parity valid logic 22 monitors the control signals which are applied to the processing elements and deduces whether or not the parity bits in the parity processing elements are invalidated by these signals. The parity valid logic bases its decision not only upon the current values of the control signals but also, in effect, upon the previous values of those signals, since the previous values affect the states of the registers QV and CV.

CONCLUSION

In the system described above, each processing element is extremely simple in structure. However, in other embodiments of the invention more complex processing elements (such as described, for example, in the published patent specification and copending patent application referred to above) may be employed. In such a case, the parity valid logic would, of course, also be more complex. In any case, the parity valid logic should preferably be so arranged that at least a major proportion of the logic of each processing element is parity checked during a typical sequence of data processing operations.

In other embodiments of the invention, there may be more than one parity processing element for each row of the array, so as to provide a higher degree of parity checking. For example, where there are 64 data processing elements in each row of the array, a parity processing element could be provided for each group of eight adjacent data processing elements, so that there would be eight parity processing elements for each row.

I claim:
1. A data processing system comprising:
 (a) a plurality of substantially identical data processing elements each of which includes
   (i) a data store having a plurality of individually addressable locations and
   (ii) processing logic connected to the data store;
 (b) a check code processing element including
   (i) a check code store having a plurality of individually addressable locations, each location in the check code store holding a check code for the data in the set of locations in the data stores having the same address, and
   (ii) processing logic connected to the check code store;
 (c) means for applying an address signal in parallel to all the data stores and also to the check code store, to thereby address a location in each of said stores;
 (d) means for applying a single stream of control signals in parallel to all the data processing elements and also to the check code processing element to cause all the elements to perform the same operation in parallel, and thereby to produce respective output signals;
 (e) checking means connected to the data processing element and also to the check code processing element, for combining the output signals of the data processing element and check code processing element to produce a signal indicative of whether there is an error in the output signals from the data processing elements;
 (f) logic circuit means connected to receive said control signals, for deducing from said control signals whether the output signal from the check code processing element is a valid check code; and
 (g) means responsive to the logic circuit means, for suppressing the output signal from the checking means in the event that the output from the check code processing element is not a valid check code.

2. A system according to claim 1 further comprising:
 (a) means connected to the outputs of the data processing elements for generating a valid check code for those outputs, and
 (b) means responsive to the logic circuit means and operative in the event that the check code output is invalid, for substituting said valid check code for the invalid check code.

3. A system according to claim 1 wherein each data processing element and check code processing element further includes an internal register connected to the store and the processing logic of that element, and wherein the internal register of the check code processing element holds a check code for the data in the internal registers in the data processing elements.

4. A system according to claim 3 wherein the logic circuit means comprises:
 (i) a validity register and
 (ii) means for setting the validity register to indicate whether the internal register in the check code processing element contains a valid check code.

5. A system according to claim 1 wherein the data processing elements are connected in an array configuration comprising a plurality of rows and columns of elements and wherein there is provided at least one check code processing element for each row of the array.

6. A system according to claim 1 wherein said check codes are parity bits.

7. A system according to claim 6 wherein said check codes are even parity bits, wherein there is an even number of data processing elements, and wherein each data processing element includes means for inverting data before writing it into the data store but the check code processing element includes no such inverting means.

* * * * *